United States Patent [19]

Holt

[11] 3,955,175
[45] May 4, 1976

[54] DIRECTION INDICATOR CONTROL CIRCUITS FOR ROAD VEHICLES

[75] Inventor: William David Holt, Colne, England

[73] Assignee: The Lucas Electrical Company Limited, Birmingham, England

[22] Filed: June 5, 1974

[21] Appl. No.: 476,555

[30] Foreign Application Priority Data
July 12, 1973 United Kingdom............... 33330/73

[52] U.S. Cl..................................... 340/73; 340/56
[51] Int. Cl.².......................... B60Q 1/40; B60Q 1/42
[58] Field of Search .................. 340/73, 56, 55, 54, 340/52 R, 322, 62; 307/10 LS; 315/81

[56] References Cited
UNITED STATES PATENTS

| | | | |
|---|---|---|---|
| 2,845,608 | 7/1958 | Short | 340/56 |
| 3,106,981 | 10/1963 | Chakiris | 340/53 |
| 3,555,506 | 1/1971 | Daws | 340/56 |
| 3,555,507 | 1/1971 | Burson | 340/56 |
| 3,559,205 | 1/1971 | Colby | 340/52 R |
| 3,914,737 | 10/1975 | Sato | 340/73 |

*Primary Examiner*—John W. Caldwell
*Assistant Examiner*—Donnie L. Crosland
*Attorney, Agent, or Firm*—Holman & Stern

[57] ABSTRACT

A direction indicator control circuit for a road vehicle has a switch means for operating the direction indicator lamps to indicate a turn, and a pulse generator operated by return movement of the steering wheel following completion of a turn, the pulse generator producing a pulse of fixed length which serves to cancel the switch means. A pair of switches are associated with each turning direction, each pair being successively operated by the turning of the steering wheel in one order during the initiation of a turn, and in the reverse order after the completion of the turn. The pulse generator produces the fixed length pulse only when the switches are actuated in the correct order, thereby eliminating erroneous turn indicator information.

5 Claims, 1 Drawing Figure

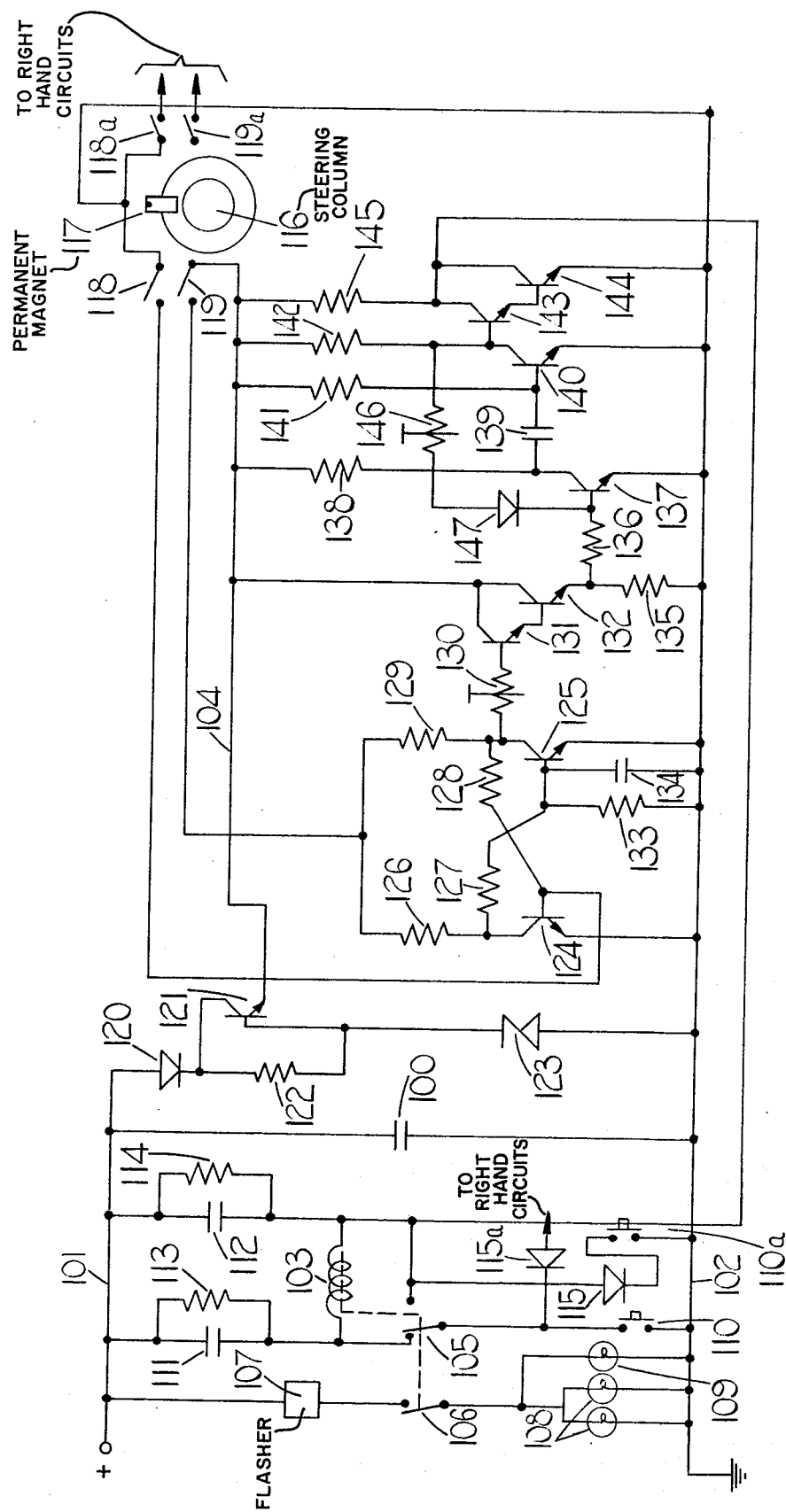

DIRECTION INDICATOR CONTROL CIRCUITS FOR ROAD VEHICLES

This invention relates to direction indicator control circuits for road vehicles.

A control circuit according to the invention comprises switch means for operating direction indicator lamps to indicate a turn, a pulse generator operated by return movement of the steering wheel following completion of the indicated turn, said pulse generator when operated producing a pulse of fixed length, and means operable by the fixed length pulse for cancelling the switch means.

The accompanying drawing is a circuit diagram illustrating diagrammatically part of one example of the invention.

Referring to the drawing, there are provided positive and negative supply lines 101, 102, the line 102 being earthed and the line 101 being connected to the battery of a road vehicle either directly or through the ignition switch of the vehicle. The lines 101, 102 are bridged by a capacitor 100.

The circuit further includes a permanent magnet latching relay having a winding 103 and two contacts 105, 106. If the winding 103 is energised by connecting its right hand end to a positive supply line and its other end to earth, then it moves the contacts from the positions shown to their alternative positions, and the contacts are held in their alternative positions by the permanent magnet, even when the winding 103 is de-energised. If the winding 103 is then energised again, this time by connecting its left hand end to the positive supply and its other end to earth, the contacts 105, 106 are moved back to the positions shown. The position of the contacts 105, 106 indicated in the drawing will be referred to as the normal position, and the alternative position as the energised position.

The contact 106 serves when in its energised position to complete a circuit between the lines 101, 102, the circuit including a flasher unit 107 and the direction indicator lamps 108 on one side of the vehicle. Connected in parallel with the lamps 108 is a pilot lamp 109 which flashes at the same time as the lamps 108. The contact 105 serves in its normal position to connect the left hand end of the winding 103 to the line 102 through a manually operable push button switch 110, and when the contact 105 is in its energised position it connects the right hand end of the winding 103 to the line 102 through the switch 110. Moreover, the ends of the winding 103 are connected to the line 101 through capacitors 111, 112 respectively, the capacitors 111, 112 being bridged by resistors 113, 114 respectively.

The line 101 is further connected through a diode 120 to the collector of an n-p-n transistor 121 having its emitter connected to a supply line 104. The collector and base of the transistor 121 are bridged by a resistor 122, and the base of the transistor 121 is connected to the line 102 through a Zener diode 123. The transistor 121 and its associated components form a voltage regulator for stabilising the supply voltage on the line 104.

The vehicle includes a steering column indicated diagrammatically at 116, and on the steering column is a permanent magnet 117. When the vehicle negotiates a left hand turn, the magnet 117 closes a pair of reed switches 118, 119, in turn. The switch 119 serves when it is closed to connect the line 104 through the switch 119 and a pair of resistors 126, 129 respectively to the collector of a pair of n-p-n transistors 124, 125 having their emitters connected to the line 102. The collectors of the transistors 124 and 125 are connected to the bases of the transistors 125 and 124 respectively through resistors 127, 128, and the base of the transistor 125 is connected to the line 102 through a resistor 133 and a capacitor 134 in parallel. The base of the transistor 124 is connected to the line 102 through the switch 118.

The collector of the transistor 125 is connected through a resistor 130 to the base of an n-p-n transistor 131 having its emitter connected to the base of an n-p-n transistor 132. The collectors of the transistors 131 and 132 are connected to the line 104, and the emitter of the transistor 132 is connected to the line 102 through a resistor 135, and through a resistor 136 to the base of an n-p-n transistor 137, the emitter of which is connected to the line 102 and the collector of which is connected through a resistor 138 to the line 104. The collector of the transistor 137 is connected through a capacitor 139 to the base of an n-p-n transistor 140 which has its base connected to the line 104 through a resistor 141, its emitter connected to the line 102, and its collector connected to the line 104 through a resistor 142, and also connected through a resistor 146, and a diode 147 to the base of the transistor 137. A further connection is made from the collector of the transistor 140 to the base of an n-p-n transistor 143 having its emitter connected to the base of an n-p-n transistor 144, the emitter of which is connected to the line 102. The collectors of the transistor 143 and 144 are connected through a resistor 145 to the line 104, and are further connected to the junction of the winding 103 and capacitor 112.

The circuit thus far described is associated only with the left hand side of the vehicle, and an equivalent set of components are associated with the right hand side of the vehicle. The equivalent reed switches 118a and 119a are seen in the drawing, as is the equivalent switch 110a which is pressed when a right hand turn is to be negotiated.

In operation, when a left hand turn is to be negotiated the driver momentarily presses the switch 110, and current flows by way of the contact 105 to charge the capacitor 111 rapidly, and to charge the capacitor 112 by way of the winding 103, thereby energizing the winding 103. Energization of the winding 103 moves the contacts 105, 106 to their energized positions, and as previously explained the contacts remain in their energised positions after the switch 110 is opened. As soon as the switch 106 is in its energized position, the flasher unit 107 operates to cause flashing of the lamps 108.

Assuming for the moment that when a turn is indicated the steering wheel 116 is not turned far enough to close either of the switches 118, 119, as can happen for example when a driver is changing lanes, then assuming that the driver wishes to cancel the unit 107 again, he touches the switch 110 a second time. The switch 105 is now in its energized position, and so closing of the switch 110 charges the capacitor 112 rapidly, and charges the capacitor 111 by way of the winding 103. Energization of the winding 103 moves the contacts 105, 106 to their normal positions to break the circuit to the unit 107.

Consider now the situation where a turn has been indicated by pressing the switch 110 and the driver starts to negotiate the turn. The switch 118 will be closed first, but will have no effect on the operation of the circuit, because at this stage the bistable circuit comprising transistors 124, 125 and their associated components is not coupled to the line 104. Thus, the transistors 131, 132 are off, as are the transistors 137, 143 and 144. The transistor 140 is held on by current flowing through the resistor 141.

Further angular movement of the steering wheel causes the switch 119 to close, so that power is supplied to the bistable circuit. At this stage the switch 118 is still closed, and so the transistor 124 cannot conduct. The capacitor 134 charges rapidly, and then the transistor 125 turns on. During the brief period while the capacitor 134 is charging, current flows through the resistors 129, 128 and the switch 118 to the line 102, and the resistor 130 is selected so that during this period the transistors 131, 132 do not turn on. Once the transistor 125 is on, then of course the transistors 131, 132 cannot turn on, and so at this stage with the switches 118, 119 both closed, transistors 131, 132 and 137 are all off, so that transistor 140 is on and transistors 143, 144 are off.

Further movement of the steering wheel opens the switch 118, but the bistable circuit remains in its state with the transistor 125 on. Finally, the switch 119 opens to remove the power from the bistable circuit.

When the turn has been completed, and the steering wheel is moved back towards its normal position, the switch 119 closes first. It will be appreciated that at this stage the capacitor 134 will have discharged through the resistor 133, and so when the switch 119 closes, the capacitor 134 will start to charge, and the transistor 124 will turn on. Current flowing through the resistor 129 will now turn on the transistors 131, 132 and 137, so that the transistor 140 has its base current diverted through the capacitor 139 and transistor 137, and turns off. The transistors 143, 144 now turn on, and so the movable contact of the switch 105 is connected to the line 102, and the flasher unit is cancelled in exactly the same way as when the switch 110 is closed. As the steering wheel moves further, the switch 118 closes and the transistor 124 turns off immediately, so that the transistor 125 turns on. The transistors 131, 132 now turn off. However, the transistor 137 is held on by current flowing through the resistor 146 and diode 147 until the capacitor 139 has charged, at which point the transistor 140 is turned on again and the transistor 137 turns off. Thus, the transistors 143, 144 are turned on for a fixed period of time and a pulse of fixed length is provided to the movable contact of the switch 105. Without this feature, if the steering wheel is being moved rapidly the time for which the transistors 143, 144 are on may not be sufficient to energise the relay winding 103.

Provision is also made for stopping off operation of the flasher unit 107 if the other switch 110a is pressed at any time. For this purpose a diode 115 is provided for connecting the junction of the winding 103 and capacitor 112 to the line 102 through the switch 110a. An equivalent diode 115a is provided for de-energising the flasher unit associated with the righthand circuits of the vehicle whenever the switch 110 is closed.

I claim:

1. A direction indicator control circuit for a road vehicle, comprising switch means for operating direction indicator lamps to indicate a turn, a pair of steering wheel actuated switches associated with each turning direction, each said pair being successively actuated in one order when negotiating a turn and in the reverse order at the completion of said turn, a pulse generator operated only by the actuation of said pair of switches in said reverse order resulting from the return movement of the steering wheel following completion of the indicated turn, said pulse generator when operated producing a pulse of fixed length, and means operable by the fixed length pulse for cancelling the switch means.

2. A circuit as claimed in claim 1 in which the pulse generator comprises a bistable circuit having first and second stable states, the bistable circuit being driven to its second state only on return movement of the steering wheel, and a monostable circuit coupled to the bistable circuit so as to be operated when the bistable circuit is in its second state to produce said fixed length pulse.

3. A circuit as claimed in claim 2 in which the bistable circuit comprises first and second transistors with collector-base cross coupling and which conduct in said first and second states respectively, said steering wheel actuated switches being closed in one order when a turn is negotiated and in the reverse order following completion of the turn, the first switch of said pair being connected between the base and emitter of the first transistor, the second switch of said providing power to the bistable circuit, and the second transistor having a capacitor across its base-emitter.

4. A circuit as claimed in claim 3 in which the switches are magnetically operated.

5. A circuit as claimed in claim 1 in which said switch means comprises a manually operable switch biased to an open position, an electromagnetic bistable latching mechanism which is operated when the switch is closed momentarily and serves to close a contact coupling a flasher unit to a flasher lamp, a further momentary closure of the switch serving to operate the latching mechanism again to open the contact, said fixed length pulse also operating the latching mechanism to open the contact.

* * * * *